US007878014B2

(12) United States Patent
Akehurst et al.

(10) Patent No.: US 7,878,014 B2
(45) Date of Patent: Feb. 1, 2011

(54) PARALLEL CONDENSING UNIT CONTROL SYSTEM AND METHOD

(75) Inventors: Brian J. Akehurst, Heathfield (GB); Hans-Juergen Bersch, Simmerath (DE); Raymond Steils, Embourg (BE)

(73) Assignee: Emerson Climate Technologies, Inc., Sidney, OH (US)

( * ) Notice: Subject to any disclaimer, the term of this patent is extended or adjusted under 35 U.S.C. 154(b) by 1305 days.

(21) Appl. No.: 11/299,285

(22) Filed: Dec. 9, 2005

(65) Prior Publication Data
US 2007/0130976 A1      Jun. 14, 2007

(51) Int. Cl.
| F25B 1/00 | (2006.01) |
| F25B 7/00 | (2006.01) |
| F25B 13/00 | (2006.01) |
| F25B 1/10 | (2006.01) |
| F25D 17/00 | (2006.01) |

(52) U.S. Cl. ............................ 62/228.5; 62/175; 62/181; 62/228.1; 62/324.6; 62/510

(58) Field of Classification Search ................ 62/228.5, 62/175, 181, 324.6, 510, 228.1
See application file for complete search history.

(56) References Cited

U.S. PATENT DOCUMENTS

| 3,201,949 A | | 8/1965 | Kocher |
| 3,580,006 A | * | 5/1971 | Quick ........................ 62/196.2 |
| 4,809,518 A | | 3/1989 | Murayama et al. |
| 4,951,475 A | * | 8/1990 | Alsenz ........................ 62/117 |
| 5,231,846 A | * | 8/1993 | Goshaw et al. ................ 62/175 |
| 5,279,131 A | | 1/1994 | Urushihata et al. |
| 5,467,604 A | * | 11/1995 | Sekigami et al. ............... 62/117 |
| 5,548,968 A | | 8/1996 | Sada et al. |
| 6,233,954 B1 | * | 5/2001 | Mehaffey et al. ............. 62/175 |
| 6,301,909 B1 | * | 10/2001 | Hayasaka ..................... 62/175 |
| 6,962,058 B2 | * | 11/2005 | Kim et al. ..................... 62/175 |
| 2005/0210901 A1 | * | 9/2005 | Nash .......................... 62/228.5 |
| 2005/0262860 A1 | * | 12/2005 | Hwang et al. ............... 62/228.5 |
| 2006/0080980 A1 | * | 4/2006 | Lee et al. ...................... 62/157 |

(Continued)

FOREIGN PATENT DOCUMENTS

DE           198 05 285 A1       8/1999

(Continued)

OTHER PUBLICATIONS

Notification of the First Office Action regarding Application No. 200610164178.5 dated Apr. 24, 2009. English translation provided by CCPIT Patent and Trademark Law Office.

*Primary Examiner*—Frantz F Jules
*Assistant Examiner*—Travis Ruby
(74) *Attorney, Agent, or Firm*—Harness, Dickey & Pierce, P.L.C.

(57) ABSTRACT

A refrigeration system comprises a plurality of compressors and a plurality of condensing units comprising a first condensing unit having a first control module and at least one additional condensing unit having an additional control module. Each condensing unit has at least one compressor of the plurality of compressors. A communication link is connected to the first control module and at least one additional control module. The first control module controls the plurality of compressors based on communication with the at least one additional control module via the communication link.

19 Claims, 4 Drawing Sheets

U.S. PATENT DOCUMENTS

2006/0112703 A1* 6/2006 Singh et al. .................. 62/183
2006/0117777 A1* 6/2006 Hwang et al. ............. 62/228.5

FOREIGN PATENT DOCUMENTS

| | | |
|---|---|---|
| EP | 0 715 132 A | 6/1996 |
| EP | 1 046 526 A | 10/2000 |
| EP | 1 054 221 A | 11/2000 |
| KR | 1020040100507 | 12/2004 |
| WO | WO 2005/036072 | 4/2005 |

* cited by examiner

PARALLEL CONDENSING UNIT CONTROL SYSTEM AND METHOD

FIELD

The present teachings relate to refrigeration systems and, more particularly, to parallel condensing unit control.

BACKGROUND

Refrigeration systems typically include a compressor, an evaporator, an evaporator fan, an expansion device, a condenser, and a condenser fan which operate together to cool a refrigerated space. The compressor, expansion device, condenser, and evaporator are fluidly coupled such that a loop or a closed system exists for circulation of a refrigerant therein. The compressor receives the refrigerant in a gaseous form from the evaporator and pressurizes the gas such that the gas changes from the gaseous state into a liquid state as it unloads heat to an air stream moving through the condenser. Once the refrigerant reaches the liquid state in the condenser, the refrigerant is sent through an expansion device before reaching the evaporator, which is held at a low pressure by the operation of the expansion device and compressor. The low pressure of the evaporator causes the refrigerant to change state back to a gas and, as it does so, to absorb heat from an air stream moving through the evaporator. In this manner, the air stream flowing through the evaporator is cooled and the temperature of the refrigerated space is lowered.

The evaporator fan is typically disposed proximate the evaporator and is operable to generate a flow of air through the evaporator and into a refrigerated space. An air flow through the evaporator is cooled as a liquid refrigerant passes therethrough. In this regard, the air flow may be regulated to control the temperature of the exiting air stream and the overall temperature of the refrigerated space.

A bank of parallel condensing units may be used in conjunction with a bank of evaporators to cool a plurality of refrigerated spaces. Each condensing unit includes one or more compressors fluidly coupled to the bank of evaporator units, whereby the evaporator units are disposed within a building generally proximate a refrigerated space and the condensing units are disposed outside of the building and are operable to expel heat absorbed by the evaporators. Having the condensing units in fluid communication with the evaporator units provides the refrigeration system with flexibility as each condensing unit may be independently activated to provide a desired amount of liquid refrigerant to each of the evaporator units, thereby evenly controlling the cooling of each refrigerated space.

Conventionally, the condensing units operate independently according to local set points. The conventional system, however, results in certain inefficiencies. For example, compressors on each of the condensing units may be activated and deactivated independent of condenser capacity across the bank of condensing units. In such case, one condensing unit may be operating at or near maximum compressor capacity while a parallel condensing unit may be operating at or near minimum compressor capacity.

SUMMARY

A refrigeration system comprises a plurality of compressors and a plurality of condensing units including a first condensing unit having a first control module and at least one at least one additional condensing unit having an additional control module. Each condensing unit has at least one compressor of the plurality of compressors. A communication link is connected to the first control module and at least one additional control module. The first control module controls the plurality of compressors based on communication with the at least one additional control module via the communication link.

The first control module may activate a deactivated compressor on a condensing unit with a least number of activated compressors in said plurality of condensing units.

The first control module may deactivate an activated compressor on a condensing unit with a greatest number of activated compressors in said plurality of condensing units.

A method of controlling a refrigeration system having a plurality of condensing units, each condensing unit having at least one compressor, includes monitoring an operating parameter of the refrigeration system and comparing the operating parameter to a set point. The method may also include directly controlling at least one compressor of a first condensing unit of the plurality of condensing units based on the comparison and indirectly controlling at least one compressor of a second condensing unit based on the comparison by communicating with a control module of the second condensing unit.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the teachings, application, or uses.

Figure 1:
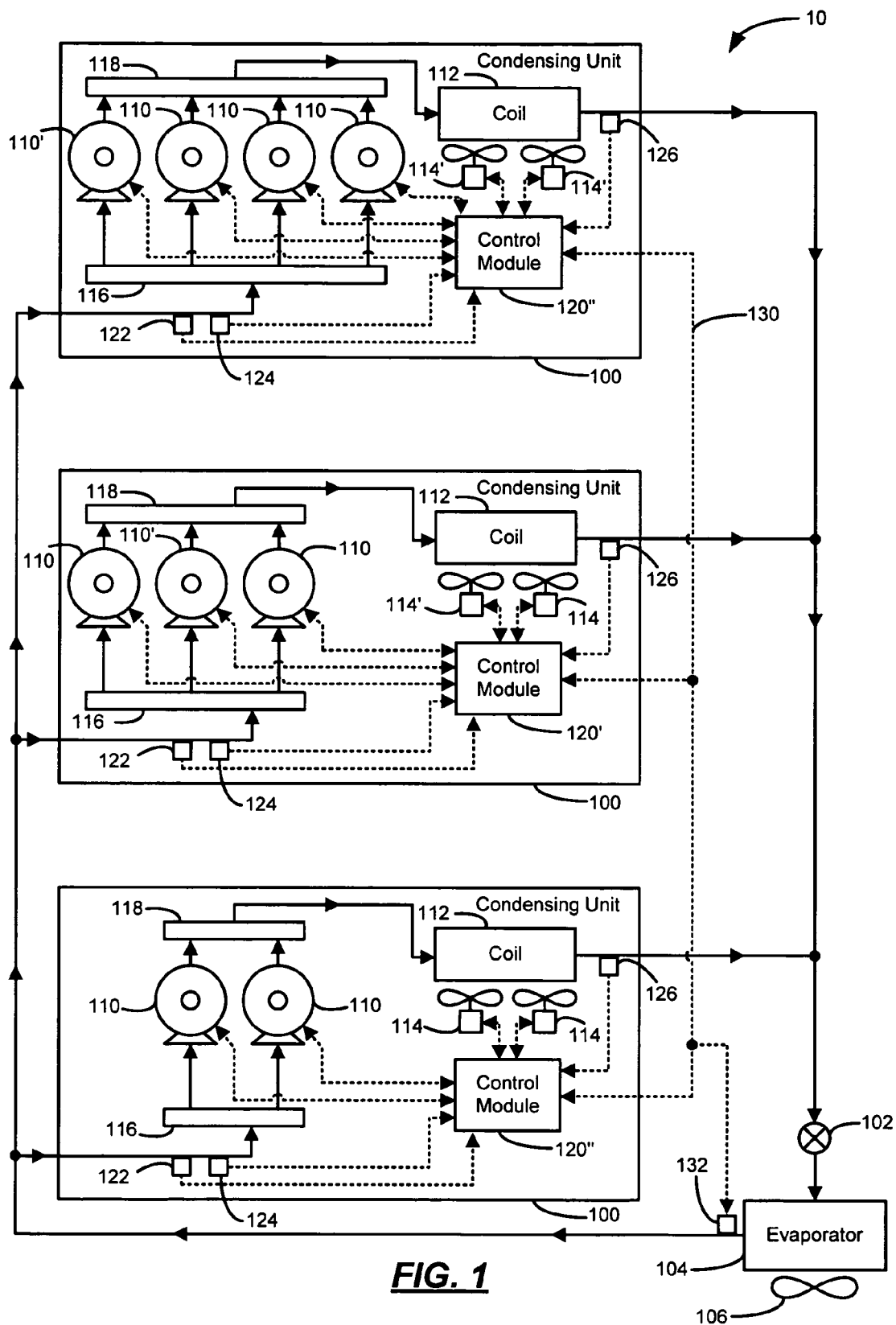
FIG. 1 is a schematic of a refrigeration system according to the teachings.

With reference to FIG. 1, a refrigeration system 10 includes condensing units 100 connected in parallel, an expansion device 102, an evaporator 104, and an evaporator fan 106. Each condensing unit 100 includes at least one compressor 110, a coil 112, and at least one condenser fan 114. As can be appreciated, while three condensing units 100 are shown, the refrigeration system 10 may include any number of condensing units 100. Additionally, while condensing units 100 are shown with two, three, and four compressors 110, condensing units may have any number of compressors 110. Further, while the condensing units 100 are shown with two condenser fans 114, condensing units 100 may include any number of condenser fans 114.

The compressors 110 receive refrigerant in a gaseous state from the evaporator 104 and return the gaseous refrigerant to the liquid state through cooperation with the coil 112 and condenser fans 114. Specifically, each compressor 110 is fluidly coupled to the evaporator 104 by a fluid conduit and a suction manifold 116 such that gaseous refrigerant exiting the evaporator 104 is received by the compressors 110 via the suction manifold 116. Refrigerant exiting the compressors 110 is received by a discharge manifold 118. In FIG. 1, the flow of refrigerant is shown by solid arrowed lines. The compressors 110 may be scroll compressors as disclosed by U.S. Pat. No. 6,350,111 assigned to Copeland Corporation of Sidney, Ohio, U.S.A., which is expressly incorporated herein by reference.

Upon receiving the gaseous refrigerant, the compressors 110 increase the pressure of the gaseous refrigerant, thereby causing the refrigerant to circulate through the coil 112 under high pressure. As the refrigerant is circulated through the coil 112, the refrigerant is cooled by the condenser fans 114 circulating an air flow over the coil 112. As the high pressure, gaseous refrigerant is circulated through the coil 112, heat is rejected from the refrigerant and carried away from the coil 112 by the air flow generated by the condenser fans 114. Such a concurrent reduction in temperature and increase in pressure causes the gaseous refrigerant to change state and revert back to the liquid state.

The expansion device 102 reduces the pressure of the liquid refrigerant to thereby ease the transition of the refrigerant from the liquid state to the gaseous state. Such conversion causes the refrigerant to absorb heat from an area surrounding the evaporator, thereby cooling the surrounding area. While one evaporator 104 and expansion device 102 are shown, the refrigeration system 10 may include any number of evaporators 104 with expansion devices 102.

As the liquid refrigerant expands via the expansion device 102, the refrigerant starts to transition from the liquid state to the gaseous state. An evaporator fan 106 circulates an air flow through the evaporator 104 such that heat from the air flow is absorbed by the refrigerant, thereby cooling a refrigerated space disposed proximate the evaporator 104. The heat absorption, combined with the decrease in pressure caused by the expansion device 102, causes the refrigerant to change state back into the gaseous state. Once the refrigerant reaches the gaseous state, the gaseous refrigerant is drawn toward the condensing units 100 once again due to a suction imparted thereon by the compressors 110. As the compressors 110 are fluidly coupled to the evaporators 104 via conduit, the compressors create suction in the conduit as gaseous refrigerant is compressed in the condensing units 100. In this manner, the gaseous refrigerant disposed in the evaporator 104 is drawn into the compressors 110 and the cycle begins anew.

Distributed condensing units are disclosed in assignee's commonly-owned International Application Number PCT/US2004/033001, filed Oct. 8, 2004, with priority claim to U.S. provisional Patent Application No. 60/509,469, filed Oct. 8, 2003, both of which are incorporated herein by reference.

Each condensing unit 100 includes a control module 120 that controls operation of the condensing unit. Specifically, the control module selectively operates the compressors 110 and condenser fans 114. The control module 120 receives operating signals based on operating parameters of the refrigeration system 10. Received operating signals include a suction pressure signal, a suction temperature signal, and a discharge pressure signal. As can be appreciated, other refrigeration system operating signals may also be received.

A suction pressure sensor 122 generates the suction pressure signal based on suction pressure on the suction side of the condensing unit 100. A suction temperature sensor 124 generates the suction temperature signal based on suction temperature on the suction side of the condensing unit 100. A discharge pressure sensor 126 generates the discharge pressure signal based on discharge pressure on the discharge side of the condensing unit.

The control module 120 receives feedback signals from the compressors 110 and condenser fans 114. The feedback signals indicate the operating state of the specific compressor 110 or condenser fan 114. In this way, when the control module 120 activates or deactivates a compressor 110 or a condenser fan 114, the control module 120 is able to verify that the compressor 110 or condenser fan 114 has responded accordingly.

Each of the control modules 120 is connected to a communication link 130 that enables the control modules 120 to communicate with each other to coordinate operation of the condensing units 100. The communication link may include an Ethernet connection, an internet connection, a LAN, an intranet, or other suitable network connection enabling the control modules 120 to send and receive messages. Additional network hardware (not shown) such as a router, switch, or hub may be included. The communication link 130 may be a wired or wireless connection.

The control modules 120 selectively activate compressors 110 and condenser fans 114 based on the received operating signals. The control modules 120 compare the suction pressure signal, or the suction temperature signal, to a predetermined, or user inputted, set point. The control modules 120 activate a compressor 110, if any are deactivated, when the suction pressure or suction temperature is greater than the set point. The control modules 120 deactivate a compressor 110, if any are activated, when the suction pressure or suction temperature signal is less than the set point. As described in more detail below, the control modules 120 communicate via the communication link to coordinate compressor operation.

Generally, the control modules 120 increase compressor capacity along with condenser capacity. To this end, compressor capacity is increased and decreased in a concurrent manner across the bank of condensing units 100. When selecting a compressor 110 for activation, the control modules 120 communicate to find a deactivated compressor 110 on a condensing unit 100 with the least number of activated compressors 110. Likewise, when selecting a compressor 110 to deactivate, the control modules 120 communicate to find an activated compressor on a condensing unit 100 with the most activated compressors 110.

The control modules 120 also coordinate condensing unit and compressor operation time. When multiple condensing units 100 are available to satisfy a compressor activation or deactivation request, a rotating condensing unit schedule is used to select the condensing unit. When multiple compressors 110 on a condensing unit are available to satisfy a compressor activation or deactivation request, a rotating compressor schedule is used to select the compressor 110.

To coordinate operation of the condensing units, one of the condensing unit control modules 120 functions as the master control module 120', or MCM 120', while the remaining control modules 120 function as the slave control modules 120", or SCM's 120". The MCM 120' communicates with the SCM's 120" and selectively activates compressors across all of the condensing units. The MCM 120' controls all of the compressors across the bank of condensing units 100.

The MCM 120' may individually poll each of the SCM's 120" to coordinate compressor operation. In such case, the MCM 120' may determine the number of activated and deactivated compressors 110 on each condensing unit 100. Alternatively, the MCM 120' may communicate a request message that is passed along to each SCM 120" until the request can be satisfied, or until the request is returned unsatisfied. When an SCM 120" is able to satisfy the request, it communicates an answer to the MCM 120' indicating so.

The MCM 120' directly controls the compressors 110 located on its condensing unit 100 by the direct connections from the MCM 120' to its associated compressors 110. The MCM 120' indirectly controls the compressors 110 located on other condensing units 100 by communicating with the SCM's 120" located on the other condensing units 100.

Figure 2:
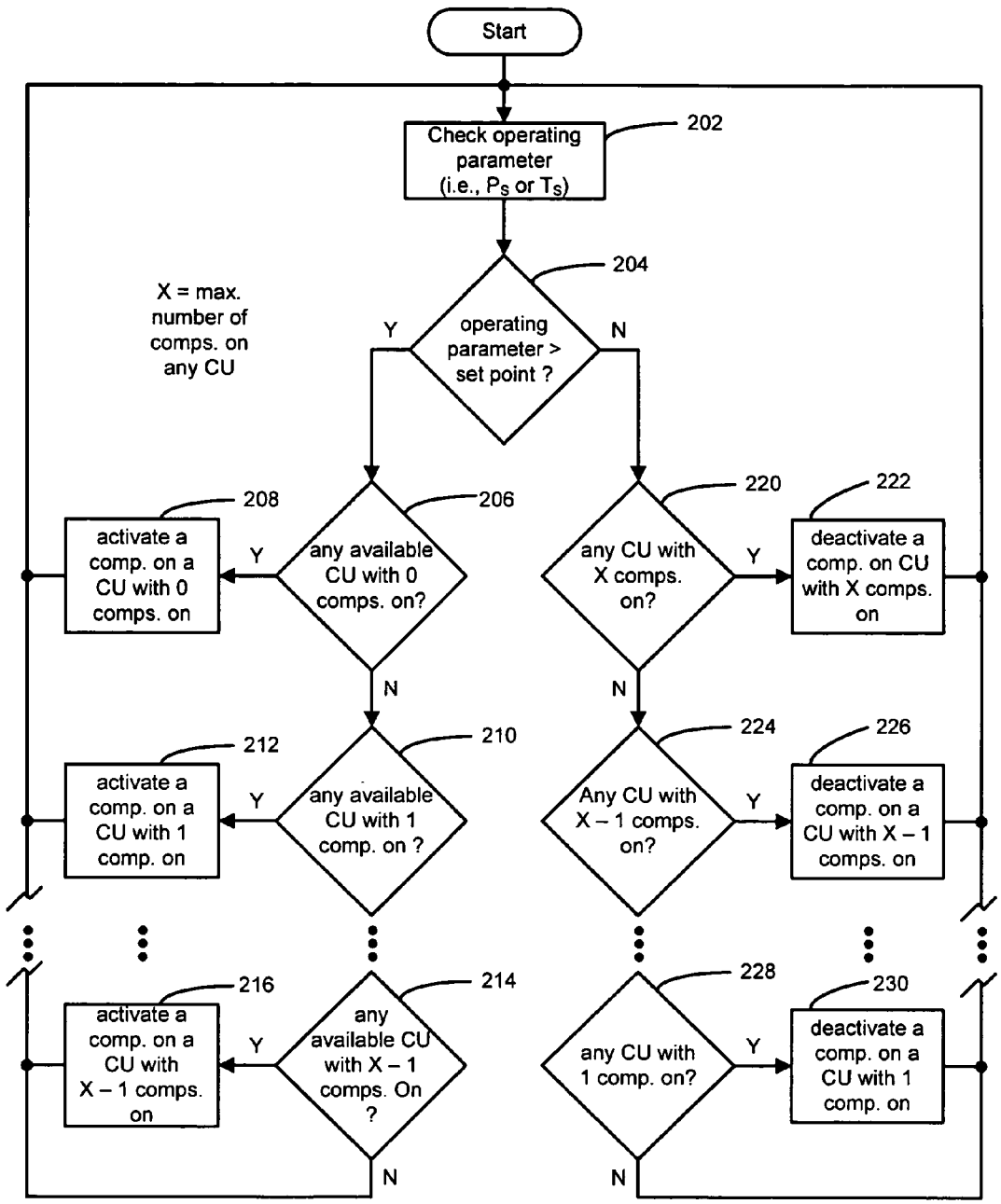
FIG. 2 is a flow chart illustrating steps performed to activate and deactivate compressors according to the teachings.

Operation of the MCM 120' is now described with continued reference to FIG. 1 and with reference to FIG. 2, which illustrates steps performed by the MCM 120' to coordinate compressor operation across condensing units 100. In step 202, the MCM 120' checks the refrigeration system operating parameter. The operating parameter may be suction pressure ($P_s$) or suction temperature ($T_s$), or other suitable refrigeration system operating parameter. For example, the MCM 120' may simply monitor the local suction pressure or suction temperature signal from the suction pressure sensor 122 or suction temperature sensor 124 on its own condensing unit. Alternatively, the MCM 120' may monitor an average suction pressure or suction temperature across all the condensing units 100. Alternatively, the MCM 120' may monitor an operating parameter from a refrigeration system operating sensor not attached to a refrigeration unit. For example, the MCM may receive an evaporator discharge temperature signal from an evaporator discharge temperature sensor 132 via the communication link 130. Additionally, the MCM 120' may receive an ambient temperature signal from an ambient temperature sensor (not shown), and may monitor a difference between discharge temperature and ambient temperature.

In step 204, the MCM 120' compares the operating parameter with the set point. The set point may be predetermined or received as a user input. The set point may be adjusted during operation of the refrigeration system. When in step 204 the operating parameter is greater than the set point, the MCM 120' takes steps to activate a compressor starting with step 206.

In step 206, the MCM 120' determines whether any available condensing unit 100 has zero compressors 110 activated. An available condensing unit 100 is a condensing unit 100 with less than all of its compressors 110 activated. When in step 206 an available condensing unit 100 has zero compressors 110 activated, the MCM 120' activates a compressor 110 on a condensing unit 100 with zero compressors 110 activated in step 208. When in step 206 the MCM 120' determines there are no condensing units 100 with zero compressors 110 activated, the MCM 120' proceeds to step 210.

In step 210, the MCM 120' determines whether any available condensing unit 100 has one compressor 110 activated. When in step 210 an available condensing unit 100 has one compressor 110 activated, the MCM 120' activates a compressor 110 on a condensing unit 100 with one compressor 110 activated in step 212. When in step 210 the MCM 120' determines there are no available condensing units 100 with one compressor 110 activated the MCM 120' proceeds.

The MCM 120' continues in this fashion, incrementing the compressor number by one, up to X, the maximum number of compressors 110 on any condensing unit 100. In step 214, the MCM 120' determines whether any available condensing unit 100 has X−1 compressors 110 activated. When in step 214 an available condensing unit 100 has X−1 compressors 110 activated, the MCM 120' activates a compressor 110 on a condensing unit 100 with X−1 compressors 110 activated in step 216. When in step 214 the MCM 120' determines there are no available condensing units 100 with X−1 compressors 110 activated, all of the compressors 110 in the refrigeration system 10 are activated, and the MCM 120' loops back to step 202. As can be appreciated, the MCM 120' may wait a predetermined cycle time before continuing with another iteration starting with step 202.

When in steps 208, 212, and 216 there is more than one available condensing unit 100 with the given number of activated compressors 110, the MCM 120' chooses the condensing unit 100 based on a rotating schedule. In this way overall operating time is roughly equal across the condensing units.

In steps 208, 212, and 216, activation of a compressor 110 is accomplished by a local condensing unit control module 120. For example, when the compressor 110 to be activated is located on the same condensing unit 100 as the MCM 120', the MCM 120' activates the compressor 110 directly. When the compressor 110 to be activated is located on a condensing unit 100 controlled by an SCM 120", the MCM 120' communicates a compressor activation request to the SCM 120". The SCM 120" receives the request, and activates a compressor 110. Like selection of the condensing units 100, the compressors 110 on a given condensing unit 100 are also activated according to a rotating schedule. In this way compressor operating time is roughly equal for compressors 110 on a given condensing unit 100.

Condensing units 100 may have one or more variable capacity compressors 110'. In such case, the variable capacity compressors 110' may be activated prior to activation of the fixed capacity compressors 110. The variable capacity compressors 110' may be operated at varying capacity until reaching a threshold capacity, such as the maximum compressor capacity. When the threshold capacity is reached, the fixed capacity compressors 110 may be activated as set forth above.

The control modules 120 receive feedback signals from the compressors 110 indicating an operating state of the compressor 110. When a control module 120 attempts to activate a compressor 110 and the feedback signal indicates that the compressor 110 is not responding, the control module 120 may attempt to activate another compressor 110 on the condensing unit. When an SCM 120" is not able to activate any compressor 110 on the condensing unit, the SCM 120" communicates to the MCM 120' that it is not able to satisfy the request. When the MCM 120' is not able to activate any compressor on its condensing unit 100, it may attempt to activate a compressor 110 on another condensing unit 100.

In steps 208, 212, and 216, the MCM 120' waits until it receives a feedback signal from a compressor 110 or a response from an SCM 120" indicating that a compressor 110 was successfully activated and loops back to step 202. As can be appreciated, the MCM 120' may wait a predetermined cycle time before continuing with another iteration starting with step 202.

When in step 204 the operating parameter is not greater than the set point, the MCM 120' takes steps to deactivate a compressor 110 starting with step 220. In step 220, the MCM 120' determines whether any condensing unit 100 has X compressors 110 activated, where X is the maximum number of compressors 110 on any condensing unit 100. When in step 220 a condensing unit 100 has X compressors 110 activated, the MCM 120' deactivates a compressor 110 on a condensing unit 100 with X compressors 110 activated.

When in step 220 the MCM 120' determines there are no condensing units 100 with X compressors 110 activated, the MCM 120' proceeds to step 224 and determines whether any condensing unit 100 has X−1 compressors 110 activated. When in step 224 a condensing unit 100 has X−1 compressors 110 activated, the MCM 120' deactivates a compressor 110 on a condensing unit 100 with X−1 compressors 110 activated in step 226.

The MCM 120' continues in this fashion, decrementing the compressor number by one, down to 1 in step 228. In step 228, the MCM 120' determines whether any condensing unit 100 has 1 compressor 110 activated. When in step 228 a condensing unit 100 has 1 compressor 110 activated, the MCM 120' deactivates a compressor 110 on a condensing unit 100 with 1 compressor 110 activated in step 230. When in step 228 the MCM 120' determines there are no condensing units 100 with 1 compressor 110 activated, all of the compressors 110 in the refrigeration system 10 are deactivated, and MCM 120' loops back to step 202. As can be appreciated, the MCM 120' may wait a predetermined cycle time before continuing with another iteration starting with step 202.

When in steps 222, 226, and 230 more than one condensing unit 100 has the given number of activated compressors 110, the MCM 120' again chooses the condensing unit 100 based on the rotating schedule. When the compressor 110 to be deactivated is located on a condensing unit 100 controlled by an SCM 120", the MCM 120' communicates a compressor deactivation request to the SCM 120". The SCM 120" receives the request, and deactivates a compressor 110. Like the condensing units 100, the compressors 110 are also deactivated according to a rotating schedule.

In steps 222, 226, and 230, the MCM 120' waits until it receives a feedback signal from a compressor 110 or a response from an SCM 120" indicating that a compressor 110 was successfully deactivated and loops back to step 202. As can be appreciated, the MCM 120' may wait a predetermined cycle time before continuing with another iteration starting with step 202.

In the event the communication link 130 fails or is disconnected, the control modules 120 selectively activate compressors 110 based on local operating parameters. In such case, each of the control modules 120 monitor the local suction pressure or temperature, and selectively activate compressors 110 based on a local default set point. In the event the local sensors fail as well, the control modules 120 may simply operate a default number of compressors 110.

The control modules 120 also control condenser fan operation. Condenser fan operation is controlled by the local control modules 120 based on discharge pressure. The control modules 120 receive the discharge pressure signal and control condenser fan operation based on a local discharge pressure set point. Generally, the control modules 120 increase condenser fan operation, if possible, when discharge pressure is greater than a predetermined or user inputted set point.

Figure 3:
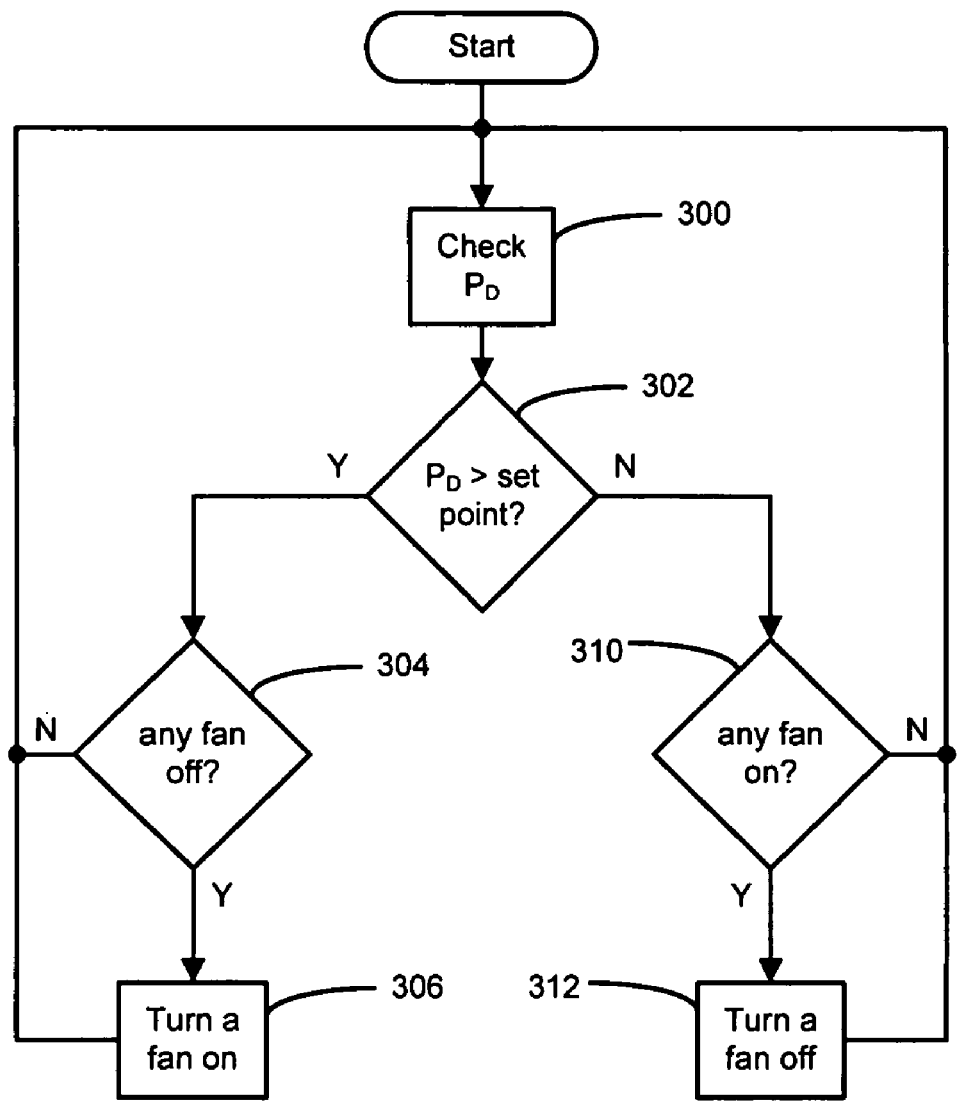
FIG. 3 is a flow chart illustrating steps performed to activate and deactivate condenser fans according to the teachings.

The condenser fans 114 may be fixed speed condenser fans 114 or variable speed condenser fans 114'. Operation of a control module 120 is now described with continued reference to FIG. 1 and with reference to FIG. 3, which illustrates steps performed by a control module 120 to control condenser fan operation for fixed speed condenser fans 114.

In step 300, the control module 120 checks the discharge pressure ($P_D$) and proceeds to step 302. When $P_D$ is greater than the set point, the control module 120 proceeds to step 304 and determines whether any condenser fan 114 is deactivated. When a condenser fan 114 is deactivated, the control module 120 activates a condenser fan 114 in step 306 and loops back to step 300. When in step 304 all condenser fans 114 are on, the control module 300 loops back to step 300. The control module 120 may wait a predetermined cycle time before continuing with another iteration starting with step 300.

In step 302 when $P_D$ is not greater than the set point, the control module 120 proceeds to step 310 and determines whether any condenser fan 114 is activated. When a condenser fan 114 is activated, the control module 120 deactivates a condenser fan 114 in step 312 and loops back to step 300. When in step 310 all condenser fans 114 are deactivated, the control module loops back to step 300. The control module 120 may wait a predetermined cycle time before continuing with another iteration starting with step 300.

The condenser fans 114 may also be variable speed condenser fans 114' with a lowest fan speed and a highest fan speed. There are two modes of variable speed fan control. First, the variable speed condenser fans 114' may be controlled in silent mode, wherein fan speed is minimized to reduce environmental noise, while maintaining $P_D$ at or below the set point. Second, the variable speed condenser fans 114' may be controlled in efficiency mode, wherein fan speed is maximized to hold $P_D$ as low as possible.

Figure 4:
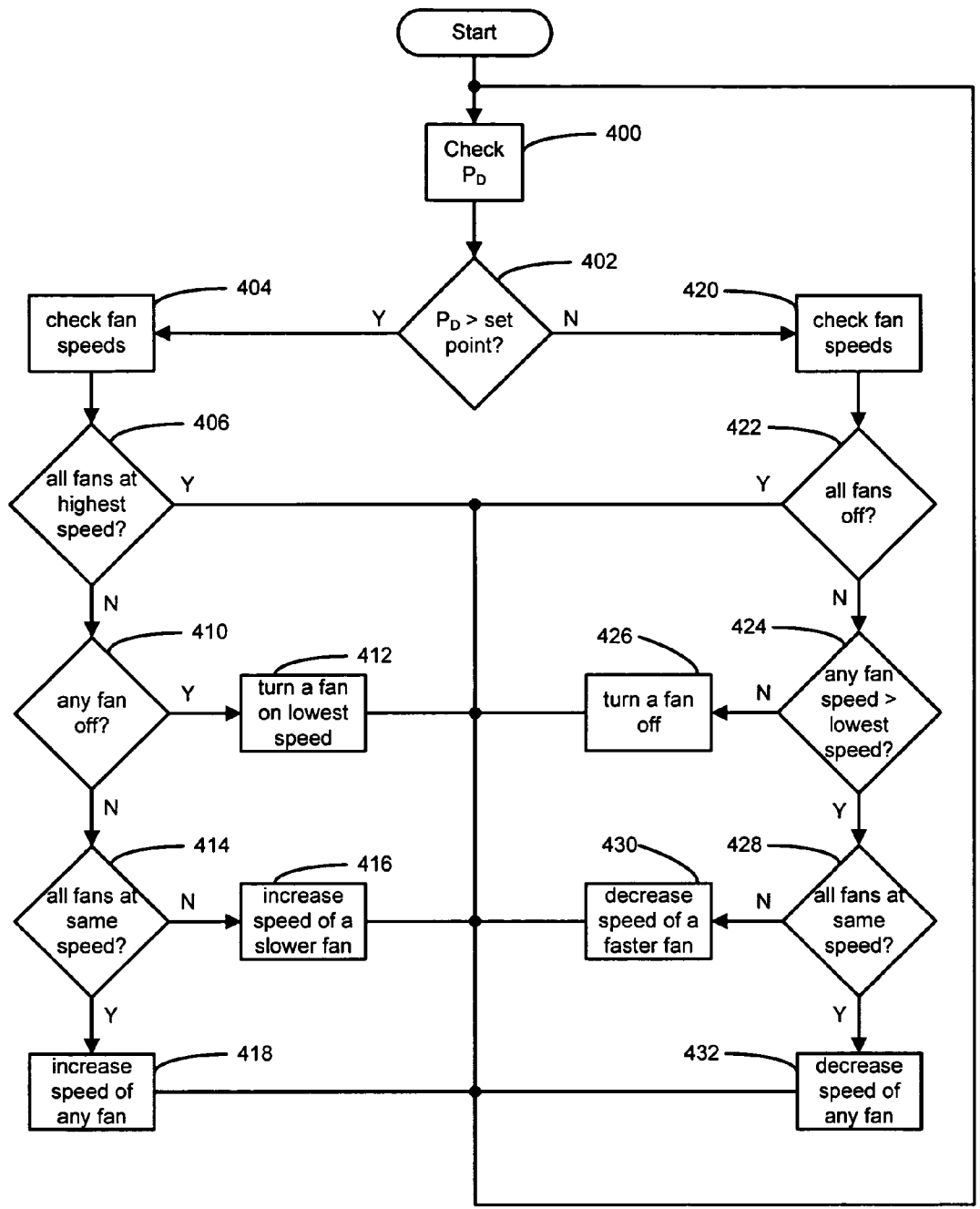
FIG. 4 is a flow chart illustrating steps performed to control condenser fan speed according to the teachings.

Silent mode operation is now described with continued reference to FIG. 1 and with reference to FIG. 4, which illustrates steps performed by a control module 120 in silent mode. In step 400, the control module 120 checks $P_D$. In step 402, the control module 120 determines whether $P_D$ is greater than the set point. When $P_D$ is greater than the set point, the control module 120 proceeds to step 404 and checks the variable condenser fan speeds for the condensing unit 100.

In step 406 the control module 120 determines whether all condenser fans 114' on the condensing unit 100 are at the highest speed. When all condenser fans 114' are at the highest speed, the control module 120 loops back to step 400. When all condenser fans 114' are not at the highest speed, the control module 120 determines whether any condenser fan 114' is deactivated in step 410. When a condenser fan 114' is deactivated in step 410, the control module 120 activates a condenser fan 114' at the lowest speed in step 412 and loops back to step 400.

When all condenser fans 114' are activated in step 410, the control module 120 determines whether all condenser fans 114' are at the same speed in step 414. When all condenser fans 114' are not at the same speed, the control module 120 increases the speed of a slower condenser fan 114' in step 416 and loops back to step 400. When all condenser fans 114' are at the same speed in step 414, the control module 120 increases the speed of any condenser fan 114' in step 418 and loops back to step 400.

When in step 402 $P_D$ is not greater than the set point the control module 120 checks the condenser fan speeds in step 420. When in step 422 all the condenser fans 114' are deactivated, the control module 120 loops back to step 400. When all of the condenser fans 114' are not deactivated, the control module 120 determines whether any condenser fan speed is greater than the lowest fan speed in step 424. When no fan speed is greater than the lowest fan speed, the control module 120 deactivates a condenser fan 114' in step 426 and loops back to step 400.

When in step 424 a condenser fan speed is greater than the lowest fan speed, the control module 120 determines whether all the condenser fans 114' are at the same speed in step 428. When all of the condenser fans 114' are not at the same speed, the control module 120 decreases the speed of a faster condenser fan 114' in step 430, and loops back to step 400. When all of the condenser fans 114' are at the same fan speed, the control module 120 decreases the speed of any condenser fan 114' in step 432 and loops back to step 400. The control module may wait a predetermined cycle time before proceeding with another iteration starting in step 400.

In this way overall condenser fan speed is minimized while maintaining $P_D$ below the set point. As can be appreciated, a condensing unit 100 may have a combination of fixed speed condenser fans 114 and variable speed condenser fans 114'. Such a condensing unit 100 operating in silent mode may adjust the variable speed condenser fans 114' before activating the fixed speed condenser fans 114. When the variable speed condenser fans 114' are at maximum speed, the control module 120 may then activate fixed speed fans.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A refrigeration system comprising:
   a plurality of compressors;
   a plurality of condensing units comprising a first condensing unit having a first control module and at least one additional condensing unit, each additional condensing unit having an additional control module and at least one compressor of said plurality of compressors; and
   a communication link connected to said first control module and each additional control module;
   wherein said first control module polls said each additional control module via said communication link, determines at least one of a number of activated compressors and a number of deactivated compressors on each additional condensing unit based on said polling, and controls said plurality of compressors based on said determining.

2. The refrigeration system of claim 1 wherein said first control module activates a deactivated compressor on a condensing unit with a least number of activated compressors in said plurality of condensing units.

3. The refrigeration system of claim 2 wherein when more than one condensing unit has said least number of activated compressors, said first control module makes a condensing unit selection based on a rotating condensing unit schedule.

4. The refrigeration system of claim 2 wherein when said condensing unit with said least number of activated compressors has more than one deactivated compressor, said first control module makes a compressor selection based on a rotating compressor schedule.

5. The refrigeration system of claim 1 wherein said first control module deactivates an activated compressor on a condensing unit with a greatest number of activated compressors in said plurality of condensing units.

6. The refrigeration system of claim 5 wherein when more than one condensing unit has said greatest number of activated compressors, said first control module makes a condensing unit selection based on a rotating condensing unit schedule.

7. The refrigeration system of claim 5 wherein when said condensing unit with said greatest number of activated compressors has more than one activated compressor, said first control module makes a compressor selection based on a rotating compressor schedule.

8. The refrigeration system of claim 1 further comprising an operating sensor that generates an operating signal based on an operating condition of said refrigeration system wherein said first control module compares said operating signal to a set point and controls said plurality of compressors based on said comparison.

9. The refrigeration system of claim 8 wherein said operating sensor comprises a suction pressure sensor.

10. The refrigeration system of claim 8 wherein said operating sensor comprises a suction temperature sensor.

11. The refrigeration system of claim 8 wherein said operating signal is received by said first control module via said communication link.

12. The refrigeration system of claim 1 wherein said plurality of compressors comprises at least one variable capacity compressor and at least one fixed capacity compressor and wherein said first control module activates said at least one variable capacity compressor before activating said at least one fixed capacity compressor.

13. The refrigeration system of claim 12 wherein said first control module increases a capacity of said at least one variable capacity compressor to a capacity threshold before activating said at least one fixed capacity compressor.

14. A method of controlling a plurality of condensing units, including a first condensing unit having a first control module and a second condensing unit having a second control module, each condensing unit having at least one compressor, said method comprising:
   controlling at least one compressor of said first condensing unit with said first control module;
   determining at least one of a number of activated compressors and a number of deactivated compressors on said second condensing unit by polling said second control module with said first control module;
   generating compressor activation and deactivation requests with said first control module based on said determining;
   communicating said compressor activation and deactivation requests from said first control module of said first condensing unit to said second control module of said second condensing unit;
   controlling at least one compressor of said second condensing unit with said second control module according to said activation and deactivation requests received from said first control module.

15. The method of claim 14 further comprising monitoring an operating parameter of said refrigeration system and comparing said operating parameter to a set point, wherein said compressor activation and deactivation requests are based on said comparing.

16. The method of claim 14 further comprising selecting a condensing unit from said plurality of condensing units having a least number of activated compressors and activating a deactivated compressor on said selected condensing unit.

17. The method of claim 16 further comprising selecting said condensing unit based on a rotating condensing unit schedule when more than one condensing unit has said least number of activated compressors.

18. The method of claim 16 further comprising selecting said deactivated compressor for activation on said selected condensing unit based on a rotating compressor schedule when said selected condensing unit with said least number of activated compressors has more than one deactivated compressor.

19. The method of claim 14 further comprising selecting a condensing unit from said plurality of condensing units having a greatest number of activated compressors and deactivating an activated compressor on said selected condensing unit.

* * * * *